US011948427B2

(12) United States Patent
Marsh et al.

(10) Patent No.: US 11,948,427 B2
(45) **Date of Patent: *Apr. 2, 2024**

(54) SYSTEMS AND METHODS FOR INCREASING A MULTIPLIER AND PROVIDING A BINGO AWARD IN ASSOCIATION WITH A MULTIPLIER

(71) Applicant: Aristocrat Technologies Australia Pty Limited, North Ryde (AU)

(72) Inventors: David Marsh, Charlottesville, VA (US); Karl Roelofs, Charlottesville, VA (US)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 0 days.

This patent is subject to a terminal disclaimer.

(21) Appl. No.: 17/871,624

(22) Filed: Jul. 22, 2022

(65) Prior Publication Data

US 2022/0358813 A1 Nov. 10, 2022

Related U.S. Application Data

(63) Continuation of application No. 16/574,895, filed on Sep. 18, 2019, now Pat. No. 11,403,914.

(51) Int. Cl.

*G07F 17/32* (2006.01)
*A63F 3/06* (2006.01)

(52) U.S. Cl.

CPC ............ *G07F 17/3244* (2013.01); *A63F 3/06* (2013.01); *A63F 3/062* (2013.01); *A63F 3/0645* (2013.01);

(Continued)

(58) Field of Classification Search

CPC ............. G07F 17/3244; G07F 17/3213; G07F 17/3267; A63F 3/0645

See application file for complete search history.

(56) References Cited

U.S. PATENT DOCUMENTS 4,448,419 A * 5/1984 Telnaes ............... G07F 17/3244 463/21
5,611,729 A * 3/1997 Schumacher ....... G07F 17/3211 463/18

(Continued)

OTHER PUBLICATIONS

Office Action dated Sep. 1, 2020 for U.S. Appl. No. 16/574,895 (pp. 1-5).

(Continued)

*Primary Examiner* — Corbett B Coburn
(74) *Attorney, Agent, or Firm* — Armstrong Teasdale LLP

(57) ABSTRACT

An electronic gaming machine includes a processor configured to control at least one display device to display at least one of a matrix of symbol positions and a plurality of multipliers, and to evaluate a bingo card to determine a bingo game outcome. The processor is also configured to evaluate a bingo card to determine a bingo game outcome, and to determine whether the bingo game outcome is a winning outcome. If the bingo game outcome is a winning outcome, the processor is also configured to determine an award value associated with the winning outcome, and to obtain an award quotient based at least in part on the award value and a value of at least one multiplier of the plurality of multipliers. In addition, the processor is configured to determine a winning reel outcome associated with the award quotient, where the winning reel outcome includes a winning plurality of symbols. The processor is also configured to control the at least one display device to display the winning plurality of symbols in the matrix of symbol positions.

19 Claims, 8 Drawing Sheets

(52) U.S. Cl.
CPC ...... *G07F 17/3213* (2013.01); *G07F 17/3267* (2013.01)

(56) References Cited

U.S. PATENT DOCUMENTS

| | | | | | |
|---|---|---|---|---|---|
| 5,772,509 | A * | 6/1998 | Weiss | G07F 17/32 463/16 |
| 6,004,207 | A | 12/1999 | Wilson, Jr. | |
| 6,537,150 | B1 * | 3/2003 | Luciano | G07F 17/32 463/16 |
| 2008/0176635 | A1 * | 7/2008 | Randall | G07F 17/3288 463/20 |
| 2008/0234041 | A1 | 9/2008 | Berman | |
| 2009/0233689 | A1 * | 9/2009 | Saito | G07F 17/32 463/20 |
| 2009/0325688 | A1 | 12/2009 | Naicker | |
| 2017/0092078 | A1 * | 3/2017 | Watkins | G07F 17/34 |
| 2021/0082241 | A1 * | 3/2021 | Marsh | G07F 17/3213 |

OTHER PUBLICATIONS

Office Action dated Feb. 8, 2021 for U.S. Appl. No. 16/574,895 (pp. 1-8).
Office Action dated May 19, 2021 for U.S. Appl. No. 16/574,895 (pp. 1-12).
Office Action (Final Rejection) dated Nov. 29, 2021 for U.S. Appl. No. 16/574,895 (pp. 1-9).
Office Action (Notice of Allowance and Fees Due (PTOL-85)) dated Apr. 13, 2022 for U.S. Appl. No. 16/574,895 (pp. 1-7).

* cited by examiner

SYSTEMS AND METHODS FOR INCREASING A MULTIPLIER AND PROVIDING A BINGO AWARD IN ASSOCIATION WITH A MULTIPLIER

CROSS-REFERENCE TO RELATED APPLICATIONS

This application is a continuation application of U.S. patent application Ser. No. 16/574,895, filed Sep. 18, 2019, the contents and disclosure of which is hereby incorporated by reference in its entirety.

TECHNICAL FIELD

The field of disclosure relates generally to electronic gaming, and more particularly, to systems and methods for increasing one or more multipliers and providing at least a portion of a bingo award in association with the one or more multipliers.

BACKGROUND

Electronic gaming machines (EGMs), or gaming devices, provide a variety of wagering games such as, for example, and without limitation, slot games, video poker games, video blackjack games, roulette games, video bingo games, keno games, and other types of games that are frequently offered at casinos and other locations. Play on EGMs typically involves a player establishing a credit balance by inserting or otherwise submitting money and placing a monetary wager (deducted from the credit balance) on one or more outcomes of an instance, or play, of a primary game, sometimes referred to as a base game. In many games, a player may qualify for secondary games or bonus rounds by attaining a certain winning combination or other triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

Slot games are often displayed to the player in the form of various symbols arranged in a row-by-column grid, or "matrix," which may define a plurality of symbol positions, and which may be generated by spinning a plurality of reels or reel strips, each of which may correspond to a respective column of the matrix. Specific matching combinations of symbols along predetermined paths, or paylines, drawn through the matrix indicate the outcome of the game. The display typically highlights winning combinations and outcomes for ready identification by the player. Matching combinations and their corresponding awards are usually shown in a "pay-table" that is available to the player for reference. Often, the player may vary his/her wager to include differing numbers of paylines and/or the amount bet on each line. By varying the wager, the player may sometimes alter the frequency or number of winning combinations, the frequency or number of secondary games, and/or the amount awarded.

Typical games use a random number generator (RNG) to randomly determine the outcome of each game. The games are designed to return a certain percentage of the amount wagered back to the player, referred to as return to player (RTP), over the course of many plays or instances of a game. The RTP and randomness of the RNG are fundamental to ensuring the fairness of the games and are therefore highly regulated. The RNG may be used to randomly determine the outcome of a game and symbols may then be selected that correspond to that outcome. Alternatively, the RNG may be used to randomly select the symbols whose resulting combinations determine the outcome. Notably, some games may include an element of skill on the part of the player and are therefore not entirely random.

Although many conventional wagering games are designed to display a plurality of symbols from a spinning plurality of reels in a matrix of symbol positions, many such games exclude any mechanism for visibly increasing or growing a multiplication factor to be applied to a game award based upon a symbol occurring on the reels. In addition, many traditional wagering games are unable to partition an award into several portions and, after partitioning the award, provide the award to a player by way of a variety of award mechanisms or features. Rather, traditional wagering games simply provide an award in its full amount to a player without prolonging or extending the award sequence and without any variation to the award sequence itself.

SUMMARY

In one aspect, an electronic gaming machine is provided. The electronic gaming machine includes at least one display device, a memory, and a processor configured to execute instructions stored in the memory, which when executed, cause the processor to at least: control the at least one display device to display at least one of a matrix of symbol positions and a plurality of multipliers; evaluate a bingo card to determine a bingo game outcome; determine whether the bingo game outcome is a winning outcome; in response to the bingo game outcome being a winning outcome, determine an award value associated with the winning outcome; obtain an award quotient based at least in part on the award value and a value of at least one multiplier of the plurality of multipliers; determine, from a paytable, a winning reel outcome associated with the award quotient, the winning reel outcome including a winning plurality of symbols; and control the at least one display device to display the winning plurality of symbols of the winning reel outcome in the matrix of symbol positions.

In another aspect, an electronic gaming machine is provided. The electronic gaming machine includes at least one display device, a memory, and a processor configured to execute instructions stored in the memory, which when executed, cause the processor to at least: control the at least one display device to display at least one of a matrix of symbol positions and a plurality of multipliers; randomly determine a game outcome; determine whether the game outcome is a winning outcome; in response to the game outcome being a winning outcome, determine an award value associated with the winning outcome; obtain an award quotient, based at least in part on the award value and a value of at least one multiplier of the plurality of multipliers; determine, from a paytable, a winning reel outcome associated with the award quotient, the winning reel outcome including a winning plurality of symbols; and control the at least one display device to display the winning plurality of symbols of the winning reel outcome in the matrix of symbol positions.

In yet another aspect, a method is provided. The method includes: controlling, by a processor, at least one display device to display at least one of a matrix of symbol positions and a plurality of multipliers; evaluating, by the processor, a bingo card to determine a bingo game outcome; determining, by the processor, whether the bingo game outcome is a winning outcome; in response to the bingo game outcome being a winning outcome, determining, by the processor, an award value associated with the winning outcome; obtaining, by the processor, an award quotient based at least in part on the award value and a value of at least one multiplier of the plurality of multipliers; determining, by the processor and using a paytable, a winning reel outcome associated with the award quotient, the winning reel outcome including a winning plurality of symbols; and controlling, by the processor, the at least one display device to display the winning plurality of symbols of the winning reel outcome in the matrix of symbol positions.

BRIEF DESCRIPTION OF THE DRAWINGS

An example embodiment of the subject matter disclosed will now be described with reference to the accompanying drawings.

DETAILED DESCRIPTION

Embodiments of the present disclosure provide systems and methods for determining whether to increase at least one multiplier of a plurality of multipliers. The multipliers may be associated with symbols or other graphics capable of slowly expanding or growing (e.g., as described herein, "metamorphosing"), and as each symbol or graphic metamorphoses, players may experience a sense that the symbols are slowly maturing towards a final award condition. In addition to increasing a multiplier, embodiments of the present disclosure also provide systems and methods for determining whether to provide an award, such as a bingo award, as well as how to partition or distribute the award. For example, a bingo award may be partially provided to the player in association with a selected multiplier and partially in association with one or more free spins of a plurality of reel strips within the matrix of symbol positions. Among other advantages, these features may serve to prolong and "spice up" an overall award process.

Figure 1:
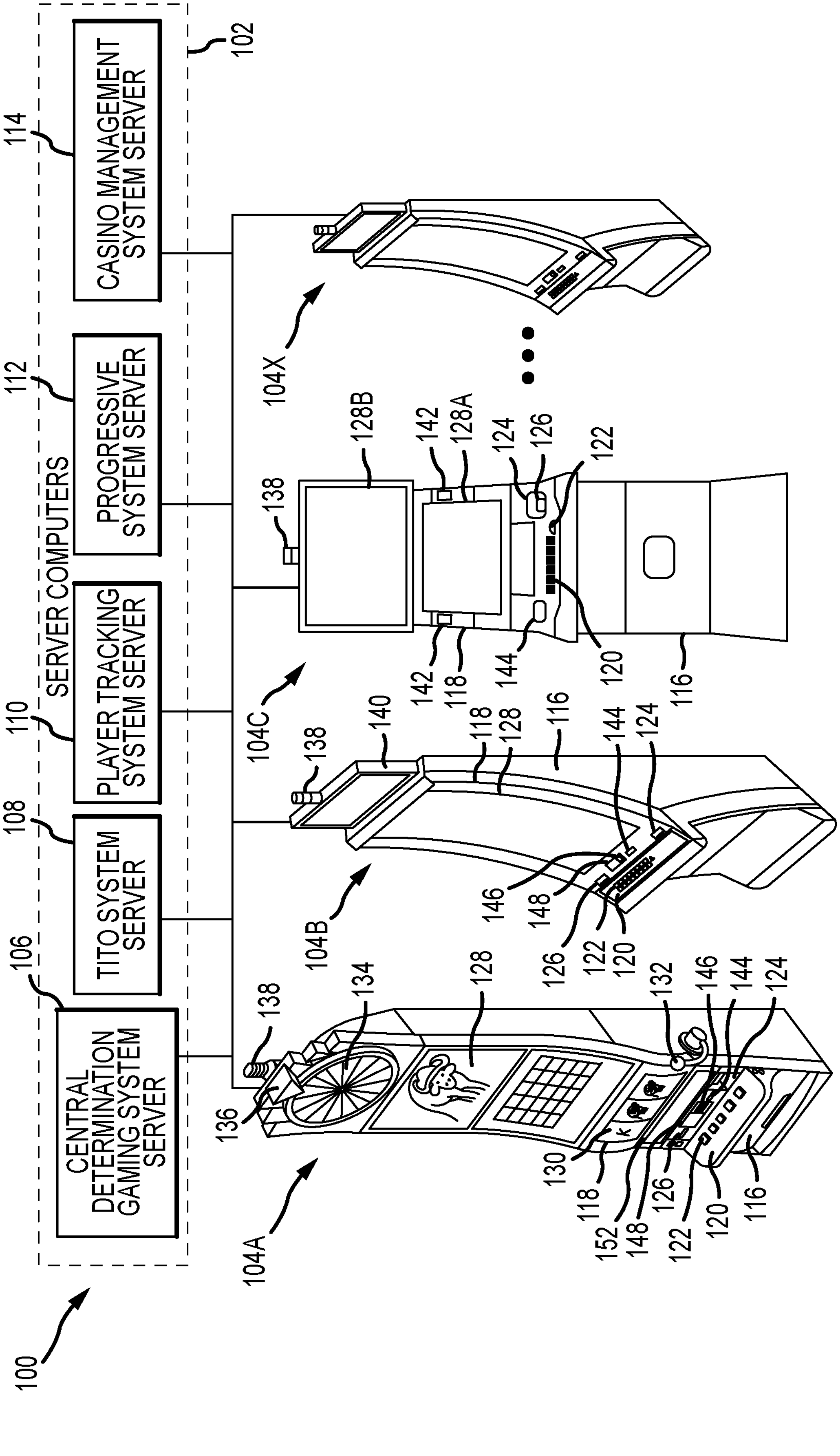
FIG. 1 is an example diagram showing several EGMs networked with various gaming-related servers.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console, although such devices may require specialized software and/or hardware to comply with regulatory requirements regarding devices used for wagering or games of chance in which monetary awards are provided.

Communication between the gaming devices 104A-104X and the server computers 102, and among the gaming devices 104A-104X, may be direct or indirect, such as over the Internet through a website maintained by a computer on a remote server or over an online data network including commercial online service providers, Internet service providers, private networks, and the like. In other embodiments, the gaming devices 104A-104X may communicate with one another and/or the server computers 102 over RF, cable TV, satellite links and the like.

In some embodiments, server computers 102 may not be necessary and/or preferred. For example, in one or more embodiments, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. In some embodiments central determination gaming server 106 may be a bingo gaming system server. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door 154 which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to determine an outcome to the game.

In many configurations, the gaming machine 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor.

In some embodiments, the bill validator 124 may also function as a "ticket-in" reader that allows the player to use a casino issued credit ticket to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are used to generate and track unique bar-codes or other indicators printed on tickets to allow players to avoid the use of bills and coins by loading credits using a ticket reader and cashing out credits using a ticket-out printer 126 on the gaming device 104A. The gaming machine 104A can have hardware meters for purposes including ensuring regulatory compliance and monitoring the player credit balance. In addition, there can be additional meters that record the total amount of money wagered on the gaming machine, total amount of money deposited, total amount of money withdrawn, total amount of winnings on gaming device 104A.

In some embodiments, a player tracking card reader 144, a transceiver for wireless communication with a player's smartphone, a keypad 146, and/or an illuminated display 148 for reading, receiving, entering, and/or displaying player tracking information is provided in EGM 104A. In such embodiments, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Figure 2:
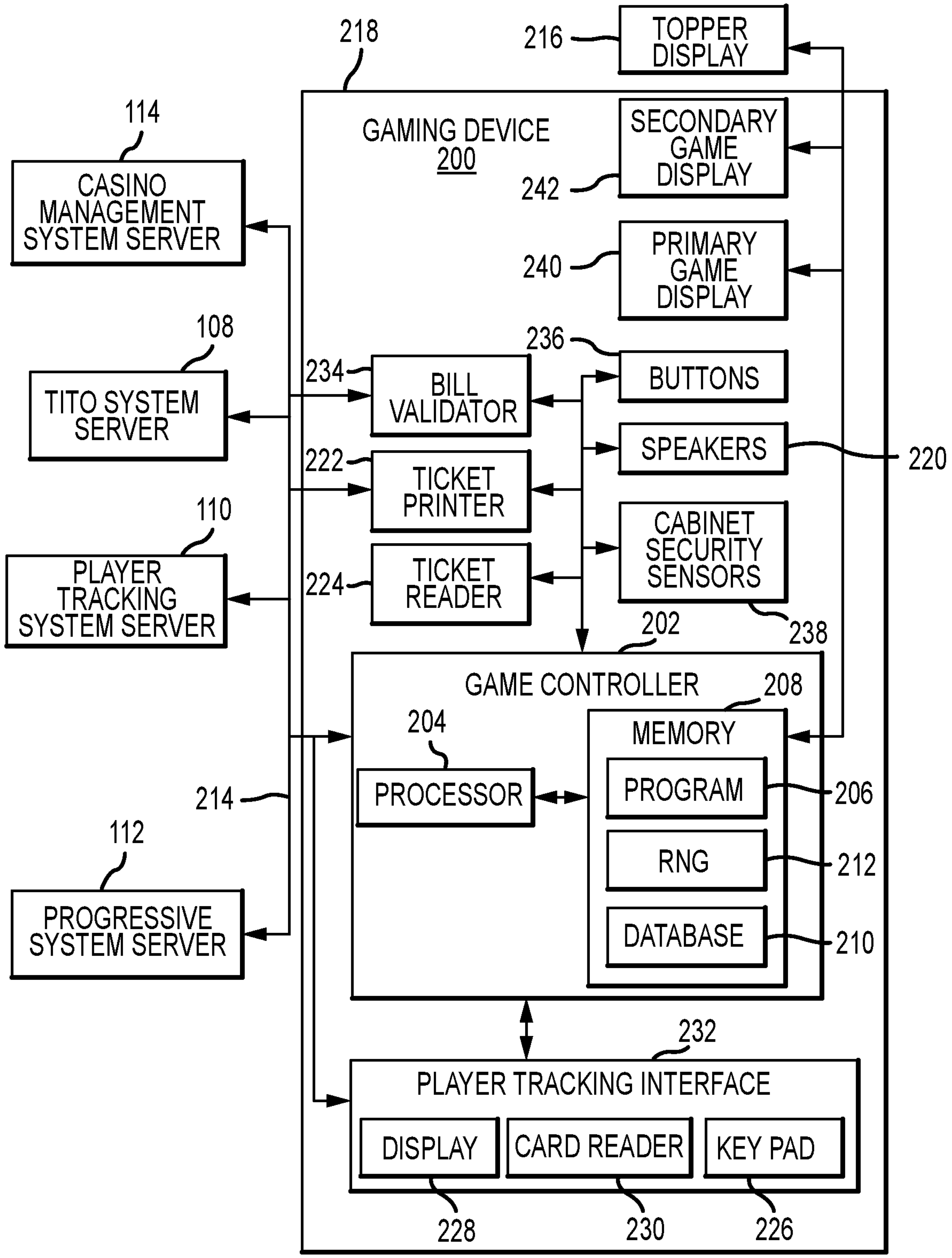
FIG. 2 is a block diagram showing various functional elements of an example EGM.

Many or all the above described components can be controlled by circuitry (e.g., a gaming controller) housed inside the main cabinet 116 of the gaming device 104A, the details of which are shown in FIG. 2.

Note that not all gaming devices suitable for implementing embodiments of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or table tops and have displays that face upwards.

An alternative example gaming device 104B illustrated in FIG. 1 is the Arc™ model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main door 154 which opens to provide access to the interior of the gaming device 104B. The main or service door 154 is typically used by service personnel to refill the ticket-out printer 126 and collect bills and tickets inserted into the bill validator 124. The main or service door 154 may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator. In some embodiments, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2 is a block diagram depicting exemplary internal electronic components of a gaming device 200 connected to various external systems. All or parts of the example gaming device 200 shown could be used to implement any one of the example gaming devices 104A-X depicted in FIG. 1. The games available for play on the gaming device 200 are controlled by a game controller 202 that includes one or more processors 204 and a game that may be stored as game software or a program 206 in a memory 208 coupled to the processor 204. The memory 208 may include one or more mass storage devices or media that are housed within gaming device 200. Within the mass storage devices and/or memory 208, one or more databases 210 may be provided for use by the program 206. A random number generator (RNG) 212 that can be implemented in hardware and/or software is typically used to generate random numbers that are used in the operation of game play to ensure that game play outcomes are random and meet regulations for a game of chance.

Alternatively, a game instance (i.e. a play or round of the game) may be generated on a remote gaming device such as a central determination gaming system server 106 (not shown in FIG. 2 but see FIG. 1). The game instance is communicated to gaming device 200 via the network 214 and then displayed on gaming device 200. Gaming device 200 may execute game software, such as but not limited to video streaming software that allows the game to be displayed on gaming device 200. When a game is stored on gaming device 200, it may be loaded from a memory 208 (e.g., from a read only memory (ROM)) or from the central determination gaming system server 106 to memory 208. The memory 208 may include RAM, ROM or another form of storage media that stores instructions for execution by the processor 204. Note that embodiments of the present disclosure represent an improvement in the art of EGM software/progressives and provide new technology in that they facilitate increases to a multiplier based upon the occurrence of one or more designated symbols in a matrix and/or providing an award in one or more parts, such as in a first part associated with a selected multiplier and a second part associated with one or more free spins. These embodiments are thus not merely new game rules or simply a new display pattern but include detailed game mechanics for increasing multipliers and partitioning and providing awards, whereby player interest, expectation, and satisfaction may be generated and improved, as described in additional detail herein.

The gaming device 200 may include a topper display 216 or another form of a top box (e.g., a topper wheel, a topper screen, etc.) which sits above cabinet 218. The cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. The player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. Ticket printer 222 may be used to print tickets for a TITO system server 108. The gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

Gaming device 200 may be connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may award players in a loyalty program. The player may use the player tracking interface 232 to access his/her account information, activate free play, and/or request various information. Player tracking or loyalty programs seek to award players for their play and help build brand loyalty to the gaming establishment. The awards typically correspond to the player's level of patronage (e.g., to the player's playing frequency and/or total amount of game plays at a given casino). Player tracking awards may be complimentary and/or discounted meals, lodging, entertainment and/or additional play. Player tracking information may be combined with other information that is now readily obtainable by a casino management system.

Gaming devices, such as gaming devices 104A-104X, 200, are highly regulated to ensure fairness and, in many cases, gaming devices 104A-104X, 200 are operable to award monetary awards (e.g., typically dispensed in the form of a redeemable voucher). Therefore, to satisfy security and regulatory requirements in a gaming environment, hardware and software architectures are implemented in gaming devices 104A-104X, 200 that differ significantly from those of general-purpose computers. Adapting general purpose computers to function as gaming devices 200 is not simple or straightforward because of: 1) the regulatory requirements for gaming devices 200, 2) the harsh environment in which gaming devices 200 operate, 3) security requirements, 4) fault tolerance requirements, and 5) the requirement for additional special purpose componentry enabling functionality of an EGM. These differences require substantial engineering effort with respect to game design implementation, hardware components and software.

When a player wishes to play the gaming device 200, he/she can insert cash or a ticket voucher through a coin acceptor (not shown) or bill validator 234 to establish a credit balance on the gamine machine. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Figure 3:
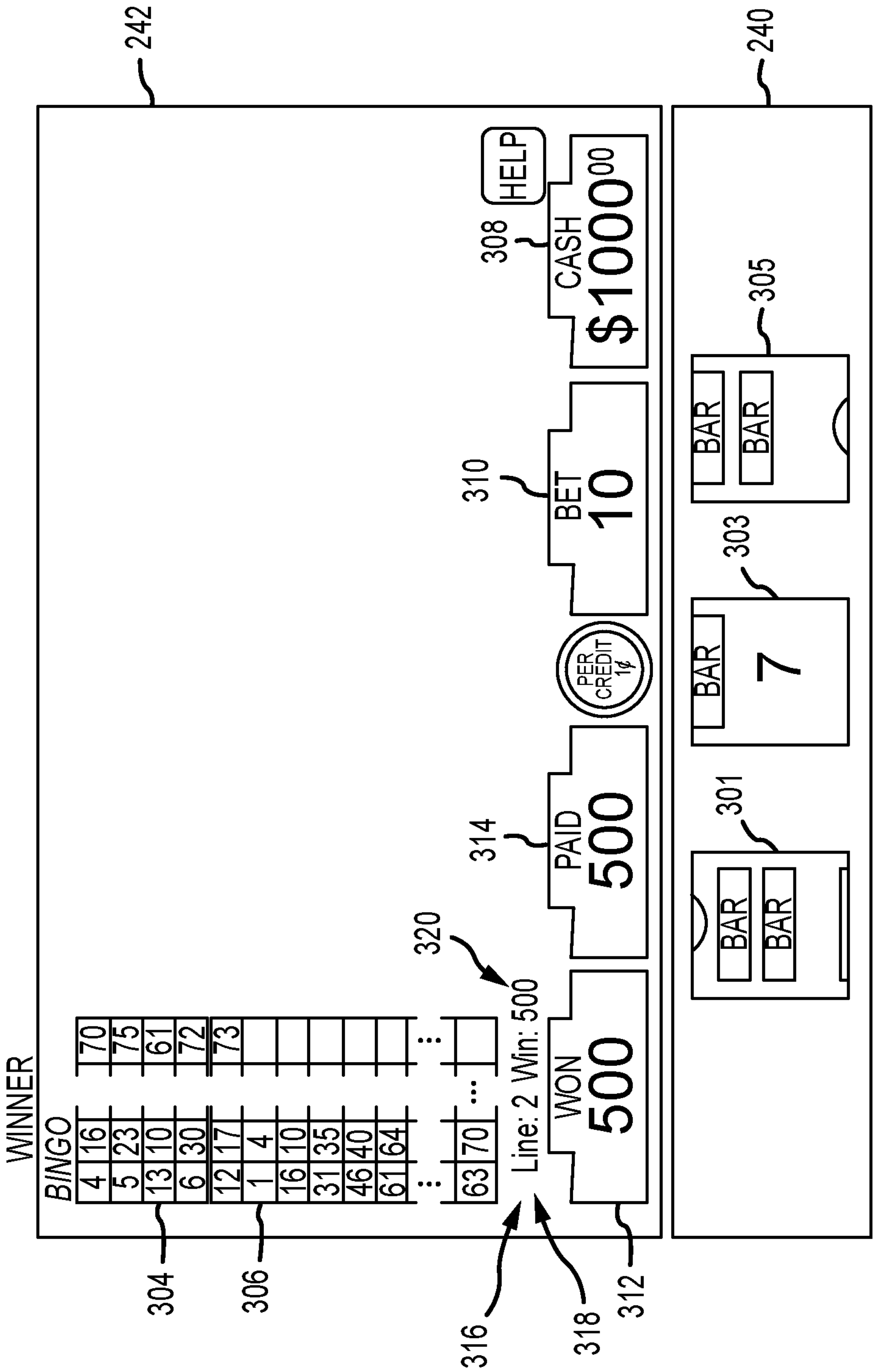
FIG. 3 is a screenshot of an example Class II bingo game being displayed on an EGM as shown in FIG. 1.

FIG. 3 depicts an example of a Class II bingo game being displayed in the primary game display 240 and secondary game display 242 of the EGM 200 of FIG. 2. In the example of FIG. 3, a plurality of reels 301, 303, and 305 are displayed within the primary game display 240. While only three reels 301, 303, 305 are shown in the example of FIG. 3, in some examples, more or fewer reels may be used. In some examples, the reels 301, 303, and/or 305 may be implemented as mechanical reels. As shown, each reel 301, 303, 305 has a plurality of symbol display positions (or more concisely, "symbol positions") for presenting symbols (and/or symbol combinations) which may be associated with winning and/or losing reel game outcomes and/or awards.

In the example of FIG. 3, a bingo card 304 and a bingo number listing 306 are displayed in the secondary game display 242. As shown, the bingo card 304 comprises a matrix of bingo cells (e.g., squares). In some examples, the matrix may be a 5×5 matrix of 25 total cells. In some examples, the bingo card 304 may have a matrix of a different size (e.g., 3×3, 4×4, 4×5, 4×6, 6×6, 7×7, 3×8, 10×10, etc.). In some examples, the matrix may be larger or smaller. In the example of FIG. 3, each cell in the matrix of the bingo card 304 includes a number that is not repeated in any other cell of the bingo card 304.

In the example of FIG. 3, the secondary game display 242 further displays a credit meter 308 showing an amount of money and/or credits (e.g. credit balance) held by a player of the EGM 200. In the example of FIG. 3, the credit balance 308 shows $1000. The secondary display 242 additionally shows a wager meter 310 adjacent to the credit meter 308, under "BET." In the example of FIG. 3, the amount wagered is 10 credits (e.g., $0.10). The amount wagered (e.g., via the user interface) may be deducted from the credit meter 308.

The secondary game display 242 additionally displays a win meter 312 and a total win meter 314. In the example of FIG. 3, the win meter 312 shows 500 credits, indicating that the simulated combination of symbols in reels 301, 303, 305 is associated with a 500 credit award (which is equal to the award associated with the bingo game outcome). As shown, the total win meter 314 also shows 500 credits, indicating that the cumulative total of awards received comprises just that one 500 credit award.

In the example of FIG. 3, the secondary game display 242 further displays reel win information 316. The reel win information 316 includes win line information 318 and award information 320. The win line information 318 indicates which win line in the reels 301, 303, 305 contains symbols comprising a winning reel game outcome. The award information 320 indicates an associated award amount for that winning reel game outcome.

In some examples, the bingo game may be a networked game that involves two or more networked EGMs 200. The bingo gaming system server 106 may manage (and/or host) the bingo game, such as by generating the bingo card 304 and/or bingo number listing 306. In some examples, the bingo card 304 (and/or information on which the bingo card 304 is based), and/or the bingo number listing 306 may be generated using an RNG. In some examples, the bingo card 304 may be randomly selected from a set of bingo cards or a player may select their own bingo card 304 (e.g., via the user interface), such as from a set of randomly generated bingo cards, for example.

In operation, a player and/or EGM 200 may be provided with the bingo card 304, such as by bingo gaming system server 106. For example, a player may be provided a new bingo card 304 each time a "Spin" or "Play" button is pressed by the player (e.g., via user interface), provided the player has made a wager. In some examples, more than one bingo card 304 may be generated in response to wager. The bingo number listing 306 (e.g., "ball call") may be randomly generated, such as by bingo gaming system server 106. The bingo card 304 may be compared to the current bingo number listing 306, and numbered cells 302 on the bingo card 304 that match numbers in the bingo number listing 306 may be marked or "daubed" on the bingo card 304. Finally, the marked or daubed bingo card 304 may be evaluated against a paytable of winning bingo patterns.

The bingo number listing 306 may be continually generated until a maximum amount of numbers are listed (e.g., seventy-five numbers listed) or until a game-ending pattern is awarded to a player participating in the bingo game. A typical game-ending pattern may be a bingo card blackout pattern, in which each of the numbers of a bingo card match a number displayed in the bingo number listing 306. Other game-ending patterns are also possible. When the game-ending pattern is awarded, the bingo number listing 306 is reset, and the process repeats. In some examples, a single play of the bingo game includes a wager, a bingo card, a bingo number listing 306, a matching of the numbers called with those on a bingo card 304, a determination of a bingo game outcome, and a presentation of an associated award, if any.

A bingo game outcome may be determined by comparing one or more patterns of marked (and/or "daubed) cells of the bingo card 304 with the paytable of winning bingo patterns. If the bingo card 304 does not include a pattern that matches a pattern in the paytable of winning patterns, then a losing bingo outcome is determined, and no award may be provided to the player. If the bingo card 304 does include a pattern that matches a pattern in the paytable of winning patterns, then a winning bingo outcome is determined, and an award may be provided to the player. Bingo card 304 may, in addition, include a plurality of winning patterns, each of which may be associated with a respective award.

Different winning patterns may be associated with different awards. The award for a winning main bingo game outcome may be based on an amount wagered, an associated main bingo game paytable, an associated set of rules for the main bingo game, a probability (and/or likelihood) of achieving a particular bingo pattern/combination, an amount of bingo numbers needed to achieve the particular bingo pattern/combination, and/or other considerations. As described herein, in some examples, the player may be awarded for multiple patterns (e.g. all winning patterns) that are matched when the bingo card 304 is evaluated against the paytable of winning patterns. In some examples, the player may be awarded for only the highest priority pattern (e.g. the highest paying winning pattern) that is matched. In some examples, during play of a Class II game, a player is provided or selects a single bingo card 304 for multiple plays of the bingo game, with a new bingo number listing 306 generated for each play of the bingo game. Other methods of play of a Class II bingo game are also possible and are within the scope of this disclosure.

The bingo game outcome may be presented to the player via a spinning reel game simulation. In the example of FIG. 3, the spinning reel game is simulated via the plurality of reels 301, 303 and 305 in the primary game display 240. For each play of the bingo game, the bingo game outcome is presented as a reel spin outcome in the reel game. In some examples, the spinning reel game simulation may operate by spinning each reel 301, 303, 305 and then stopping each reel 301, 303, 305 in a particular position to obtain a matrix of symbols. One or more combinations of symbols in the matrix of symbols may be associated with a reel game outcome that is equal to the main bingo game outcome. For example, a winning bingo game outcome may be displayed as a winning combination of reels 301, 303 and 305. Similarly, a losing bingo game outcome may be displayed as a losing combination of reels 301, 303 and 305. Different outcomes of the bingo game may be displayed as different outcomes in the spinning reel game. Thus, the bingo game outcome is presented to the player as a particular reel spin outcome of reels 301, 303 and 305.

Figure 4:
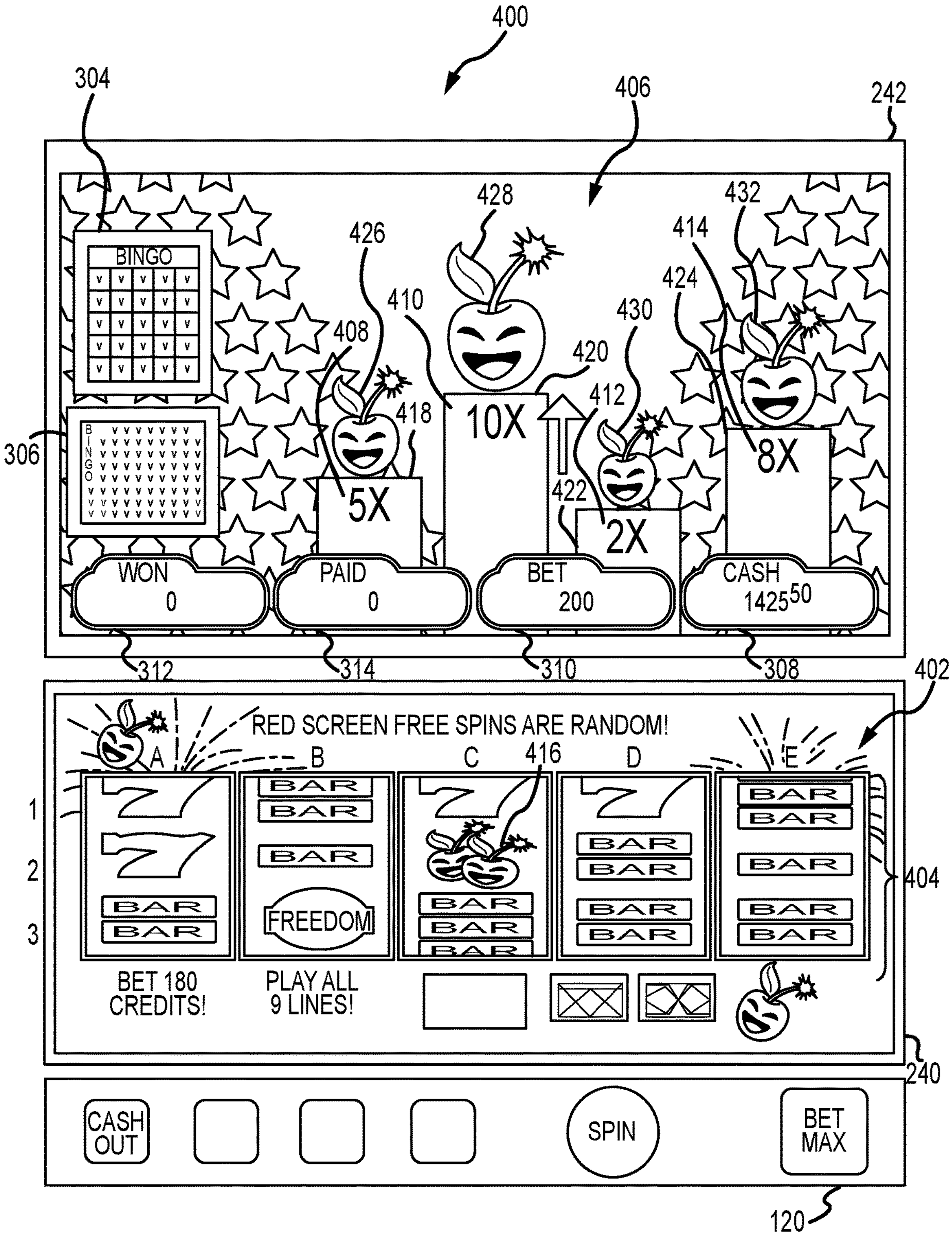
FIG. 4 is a screenshot of a wagering game played on an EGM, as shown in FIG. 1 and FIG. 2, in which a reel outcome is determined from a bingo outcome, and in which a multiplier increases in response to the occurrence of a designated symbol in the reel outcome.

FIG. 4 is a screenshot of a wagering game 400 played on an EGM 104A-104X, in which a reel outcome is determined from a bingo outcome, and in which a multiplier increases in response to the occurrence of a designated symbol in the reel outcome. Accordingly, wagering game 400 includes a bingo card 304 and a bingo number listing 306 (both described in greater detail above with reference to FIG. 3). Although wagering game 400 is described herein primarily with reference to a Class II (bingo) game, in other embodiments, wagering game 400 may be implemented as a Class III or Las-Vegas style game.

In addition, wagering game 400 may be played on several displays, such as main display 240 and secondary display 242. However, in other embodiments, wagering game 400 may be played on a single display and/or on greater than two displays. Likewise, as described herein, wagering game may be played on mechanical reels as well as "virtual" or non-mechanical reels generated or simulated using a matrix of symbol positions on a display device 240 and/or 242. Thus, a variety of embodiments are contemplated by the present disclosure and the following description is not intended to limit the scope of the present disclosure to any single embodiment.

Accordingly, in the example embodiment, wagering game 400 includes a matrix 402. In turn, matrix 402 includes a plurality of symbol positions 404 arranged in a plurality of rows and a plurality of columns. Matrix 402 may also therefore be referred to as a "matrix of symbol positions." Further, in at least some embodiments, matrix 402 may be shown on main display 240. Again, however, matrix 402 may appear in other locations on an EGM 104A-104X and/or on other displays, such as, for example, secondary display 242, a display of button deck 120, and the like.

In the example embodiment, matrix 402 is a 3×5 matrix having three rows and five columns. However, in other embodiments, matrix 402 may be any size (e.g., 2×2, 3×3, 4×4, 10×10, etc.) Each row of matrix 402 is designated by a row number (e.g., "1," "2," "3," etc.) Each column of matrix 402 is designated by a column letter (e.g., "A," "B," "C," "D," "E," etc.) As a result, in the example embodiment, matrix 402 includes fifteen symbol positions. Again, however, a number of symbol positions in matrix 402 may vary depending upon a number of rows and columns displayed in matrix 402. In some embodiments, matrix 402 may be replaced by one or more mechanical reels, and the embodiments described herein work equally well with mechanical reels as with matrix 402.

Each symbol position of matrix 402 may therefore be designated by a symbol position identifier comprising a row number (e.g., "1," "2," "3," etc.) and a column letter (e.g., "A," "B," "C," "D," "E," etc.) For example, the upper-left-most symbol position, occurring at the intersection of row 1 and column A, may be designated by the symbol position identifier "1A."

As described herein, during play of wagering game 400, symbols may be selected (e.g., such as from a plurality of reel strips) and displayed in the symbol positions of each column of symbols within matrix 402. Although not central to an understanding of the present disclosure, a "reel strip" may include a plurality of symbols arranged in a vertical column. To display symbols from a reel strip in a column of symbol positions within matrix 402, processor 204 may simulate rotation or spinning of a reel strip within one or more columns of matrix 402. Here again, however, mechanical reels having physical reel strips may be used as well.

When a respective reel strip is simulated to halt or stop within an associated column, one or more symbols may be displayed from the reel strip in the symbol positions of the column. The symbols displayed after spinning and stopping each reel strip in a respective column of matrix 402 may be referred to herein as a "reel outcome" or a "reel game outcome." Thus, a rotation and stopping of a plurality of reel strips may be simulated by processor 204 within the columns of matrix 402 to cause a reel outcome, including a plurality of symbols, to be displayed from the plurality of reel strips within the columns of matrix 402.

It will also be appreciated that symbols may be displayed in matrix 402 in response to one or more player wagers and/or, in some cases, when one or more free spins are awarded. Symbols may, in addition, be selected randomly, such as based upon a random number provided by RNG 212 and/or, as described with reference to FIG. 3, based upon one or more bingo game outcomes.

For instance, when a bingo game outcome is a winning outcome and triggers an award, processor 204 may identify a winning reel outcome (e.g., using a paytable of reel outcomes) that is associated with the same award. Having identified a winning reel outcome associated with the same award as the bingo outcome, processor 204 may cause the plurality of reel strips to spin and stop to display a combination of symbols associated with the award in matrix 402.

In addition to matrix 402, a plurality of multipliers 406 may be displayed on a display of an EGM 104A-104X, such as, for example, on secondary display 242, whereby the plurality of multipliers 406 may appear above and/or adjacent to matrix 402. It will be appreciated that multipliers 406 may appear in any other suitable location as well as on any display of an EGM 104A-104X. For example, in at least some embodiments, multipliers 406 appear on main display 240. In another embodiment, multipliers may appear on a display of button deck 120.

In the example embodiment, wagering game 400 includes four multipliers 406. These include a first multiplier 408, a second multiplier 410, a third multiplier 412, and a fourth multiplier 414. Although four multipliers 408-414 are shown and described, it will be appreciated that any suitable number of multipliers may be included in wagering game 400. As described below, the value of each multiplier 408-414 may vary during gameplay. In the illustrated embodiment, first multiplier 408 has a value of "5×," second multiplier 410 has a value of "10×," third multiplier 412 has a value of "2×," and fourth multiplier 414 has a value of "8×." Again, however, these values are merely exemplary and vary during gameplay.

Specifically, during play of wagering game 400, the value of each multiplier 408-414 may increase and decrease in response to the occurrence of one or more designated symbols within matrix 402. In the example embodiment, a designated symbol may include a "cherry" symbol, such as cherry symbol 416. However, cherry symbol 416 is merely illustrative; it will be appreciated that any other suitable designated symbol (e.g., a multiplier symbol or a wild symbol) may also be used. In the example of FIG. 4, cherry symbol 416 is displayed (or has "landed") in the third column of matrix 402 from a corresponding reel strip. It will be appreciated that each reel strip may include a plurality of cherry symbols, any number of which may be displayed within matrix 402 after the reel strips are spun and stopped.

In some embodiments, the occurrence of a designated symbol, such as cherry symbol 416, in a column of matrix 402 may cause a multiplier 408-414 to increase by an incremental value, such as, in at least some embodiments, an incremental value of one. Specifically, the symbols forming a reel outcome may also be evaluated, such as by processor 204, to determine whether a designated symbol is displayed in matrix 402, and if at least one designated symbol is present, at least one multiplier may be increased. For example, when cherry symbol 416 lands in column "C" of matrix 402, as shown, multiplier 410 may increase from a factor of "9×" to a factor of "10×."

In other embodiments, multipliers may be increased by any desired increment when a designated symbol lands in a column of matrix 402. Likewise, in some embodiments, a multiplier 408-414 vertically aligned with or otherwise corresponding to a column of matrix 402 may be increased when a designated symbol lands in the column below the multiplier 408-414. In other embodiments, a multiplier 408-414 may be randomly selected to be increased in response to occurrence of a designated symbol in a column of matrix 402. Further, if more than one designated symbol is displayed within matrix 402, any multiplier 408-414 may be increased multiple times and/or a plurality of multipliers may be increased in proportion or equal to the number of designated symbols appearing within matrix 402.

As a result, multipliers 408-414 may grow or increase during play of wagering game 400 as a player places wagers to spin and re-spin the reel strips within matrix 402. A vertical bar or pedestal, such as a first bar 418, a second bar 420, a third bar 422, and a fourth bar 424, may be provided in association with each multiplier 408-414, respectively, to illustrate growth of each multiplier. Specifically, as a value of each multiplier 408-414 increases, the vertical bar 418-424 associated with each reel may also increase.

A second or different designated symbol (e.g., a second cherry symbol) may also be provided atop each pedestal or vertical bar 418-424, and as vertical bars 418-424 grow upwards, the cherry symbol atop the vertical bar 418-424 may inflate or grow to signify that the cherry symbol is closer to "exploding" or displaying another graphic indicating that the multiplier is being used to provide at least a portion of an award. To distinguish the second or different designated symbol appearing atop each vertical bar 418-424, these symbols may also be referred to herein as "multiplier symbols."

For example, a first cherry symbol 426 may be positioned atop first vertical bar 418, a second cherry symbol 428 may be positioned atop second vertical bar 420, a third cherry symbol 430 may be positioned atop third vertical bar 422, and a fourth cherry symbol 432 may be positioned atop fourth vertical bar 424. When a multiplier 408-414 increases, the vertical bar 418-424 associated with the multiplier may grow upwards, and the cherry symbol 426-432 atop the respective vertical bar 418-424 may expand or grow as well. Stated another way, cherry symbols 426-432 may "metamorphosis" from smaller or less expanded cherry symbols to inflated or larger cherry symbols, where larger cherry symbols are closer to "exploding."

In addition to growth of multiplier (cherry) symbols 426-432 themselves, in at least some embodiments, when a designated (cherry) symbol lands within matrix 402, a color of the designated symbol may govern which cherry symbol 426-432 metamorphoses. For example in one embodiment, cherry symbols in matrix may be red, silver, gold, or blue. As a result, when a red cherry symbol lands in matrix 402, a red cherry symbol 426-432 may be increased. Likewise, when a gold cherry symbol lands in matrix 402, a gold cherry symbol 426-432 may be increased, and so on for the other colors.

Moreover, in some embodiments, each cherry symbol 426-432 may include a fuse, which may shorten as a cherry symbol 426-432 grows or metamorphoses towards an explosion. The fuse on each cherry symbol 426-432 may thus provide an additional indication to a player that the cherry symbol 426-432 is progressing towards an award condition (e.g., an explosion).

One technical improvement associated with the growth of a vertical bar 418-424 and/or the expansion or "metamorphosis" of an associated multiplier symbol (e.g., an inflating cherry symbol 426-432) positioned atop each vertical bar 418-424 is that players may experience an impending and growing sense of anticipation and/or slow maturation as each vertical bar 418-424 and/or multiplier symbol slowly expands or inflates towards a final "explosion" or award graphic, the result of which is that the multiplier is used, as described herein, to provide an award to a player of wagering game 400. In addition, the upward growth over vertical bars 418-424 may add a competitive element to wagering game 400, in that players may perceive or notice that vertical bars 418-424 appear to race upwards as designated symbols land in matrix 402.

In addition to performing operations for increasing one or more multipliers, in the example embodiment, processor 204 may also perform a variety of award determinations. As described herein, awards may also be distributed or provided in different ways, such as in increments or phases. Some of these features are described below with reference to a running example, which uses a 1,200 credit bingo award as an illustration. It will be appreciated, however, that the running example is merely illustrative, and that the values described in this example are not intended to be limiting.

Accordingly, in at least one embodiment, processor 204 may determine a bingo outcome using bingo card 304 and bingo number listing 306, as described herein. If the bingo outcome is a winning outcome, processor 204 may, in addition, determine or identify an award (e.g., from a bingo paytable) associated with the winning outcome. As described in greater detail below, a first portion of the bingo award may be provided in conjunction with a selected multiplier 408-414, and a second portion of the bingo award may be provided in conjunction with one or more free spins.

Further, having identified a bingo award to be provided to a player, processor 204 may provide the award, such as, for example, by adding a value of the award to total win meter 312. In addition to increasing total win meter 312, processor 204 may, in at least some embodiments, provide at least a portion of a bingo award in association with a reel outcome and a selected multiplier. Specifically, in at least one embodiment, processor 204 may divide the value of a bingo award by at least one multiplier 408-414 of the plurality of multipliers 406 to obtain at least one award quotient. The award quotient may, in turn, be used in providing at least a portion of an award in association with a reel outcome and a multiplier.

Figure 5:
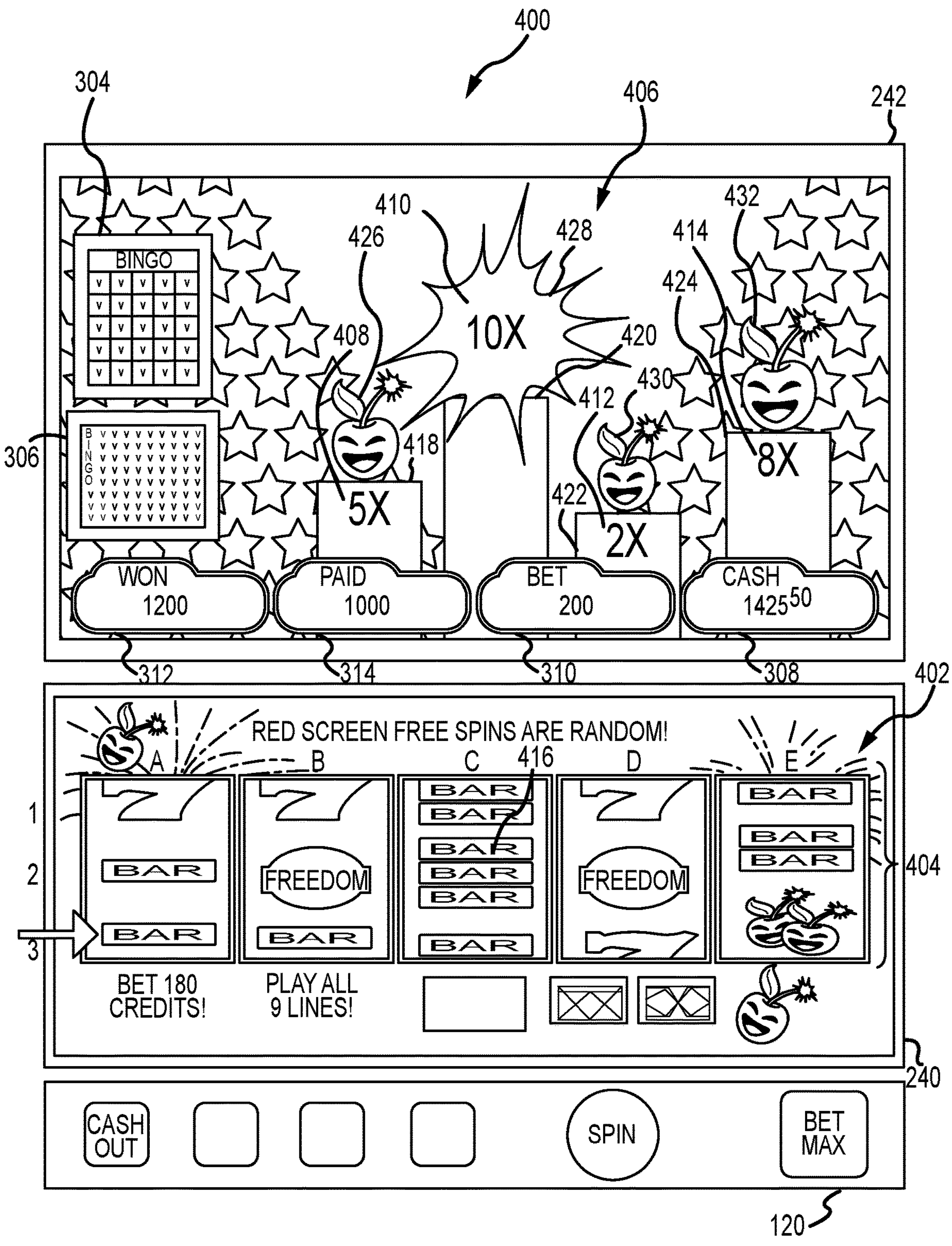
FIG. 5 is a screenshot of the wagering game, as shown in FIG. 4, in which a first portion of an award is provided in association with a winning reel outcome and a multiplier.

To illustrate, in the example shown at FIG. 5, processor 204 may divide the bingo award of 1,200 credits by the "10×" multiplier, to obtain an award quotient, such as an award quotient of 120 credits (i.e., 1,200/10=120). Processor 204 may, in addition, search a paytable of reel outcomes for a reel outcome associated with an award of 120 credits. If such a reel outcome exists, processor 204 may simulate rotation and stopping of the reel strips within matrix 402 to display the symbols associated with the 120 credit outcome and, in conjunction with the reel outcome, display selection of the "10×" multiplier (e.g., by highlighting the multiplier and/or using another visual indicator or animation). Thus, the bingo award (of 1,200 credits) may be provided in association with a reel outcome (of 120 credits) and a multiplier (of "10×").

However, in at least some embodiments, if no reel outcome exists in the paytable of reel outcomes to match a particular award quotient, processor 204 may select or test one or more different multipliers 408-414 until an award quotient is identified that matches an award associated with a reel outcome. For instance, in the example above, an award quotient using the "10×" multiplier 410 may be 120 credits, but there may not be any 120 credit reel outcomes in the paytable of reel outcomes. As a result, one or more other multipliers 408 or 412-414 may be tested to identify a multiplier 408 or 412-414 that gives an award quotient that can be matched in the paytable of reel outcomes. Once a matching award is identified, the reel outcome associated with the award may be displayed in matrix 402, and the multiplier used to perform the calculation may be highlighted or visually altered to provide a notification to the player that an award has been provided.

In addition to identifying a single multiplier 408-414 that can be used to provide at least a portion of an award to a player, in at least some embodiments, processor 204 may provide all or a portion of a bingo award to a player using a plurality of multipliers 408-414. For example, processor 204 may determine that a first half of an award may be provided in conjunction with first multiplier 408 and that a second half of the award may be provided in conjunction with third multiplier 412. More broadly, processor 204 may allocate an award between one or more multipliers in any manner desired.

In some embodiments, processor 204 may also use a particular multiplier 408-414 (e.g., the "10×" multiplier), even if there is no award in the paytable of reel outcomes that exactly matches the calculated award quotient. For example, it may be desirable, in at least some instances, to use a multiplier 408-412 that is greatest among the plurality of multipliers 406, such as, to satisfy a player expectation that a largest multiplier be selected and/or simply to add an element of player satisfaction that a largest multiplier has been used. In the example of FIG. 4, the "10×" multiplier is greatest.

To illustrate using the example above, if a bingo award of 1,200 credits is provided but no 120 credit award exists in the paytable of reel outcomes, processor 204 may identify a reel outcome in the paytable that is associated with an award closest to the award quotient of 120 credits. Assume, for this example, that the award in the paytable of reel outcomes closest to the award quotient of 120 credits is 100 credits. In this case, processor 204 may identify and display the 100 credit reel outcome in matrix 402.

In addition, processor 204 may determine a remaining portion of the bingo award, where the remaining portion is simply the difference between the bingo award and the product of the award selected from the paytable of reel outcomes multiplied by the multiplier. In this example, the remaining portion of the 1,200 credit award would be 200 credits (i.e., 1,200−100*10). It will be appreciated that the remaining portion of the bingo award may exist, in at least some cases, as a result of the fact that it may not always be possible (or desirable) to provide a last remaining portion of the bingo award (e.g., 200 credits) to a player in the form of a multiplied reel outcome. Stated another way, because there is no "12×" multiplier displayed in the example of FIG. 4, and because a reel outcome having an award value of 100 credits is selected, there are 200 credits remaining to be allocated to the player outside of the multiplication feature of wagering game 400.

In various embodiments, processor 204 may provide a remaining portion of an award to a player in the form of one or more free spins, each of which may be associated with a winning reel outcome. When the individual awards associated with these free spins are added together, they may total the remaining portion of the initial bingo award (i.e., in this example, 200 credits), whereby the player may be provided the remaining portion of the initial bingo award in the form of one or more free spins.

FIG. 5 is a screenshot of wagering game 400, in which a first portion of a bingo award is provided in association with a winning reel outcome and a multiplier. More particularly, as shown and discussed in detail above, a bingo award of 1,200 credits is provided to the player. This total award value is displayed in total win meter 312.

In addition to displaying the total bingo award in total win meter 312, processor 204 may also, as described above, select a reel outcome having an award value closest to the calculated award quotient, which may, in this case, be equal to 100 credits. The reel outcome associated with this 100 credit award may be displayed in matrix 402, and the "10×" multiplier highlighted or otherwise visually altered, as shown, to indicate that the 100 credit win appearing within matrix 402 has been multiplied by a factor of "10×" to give the player a partial award of 1,000 credits. The partial award of 1,000 credits appears in win meter 314.

Figure 6:
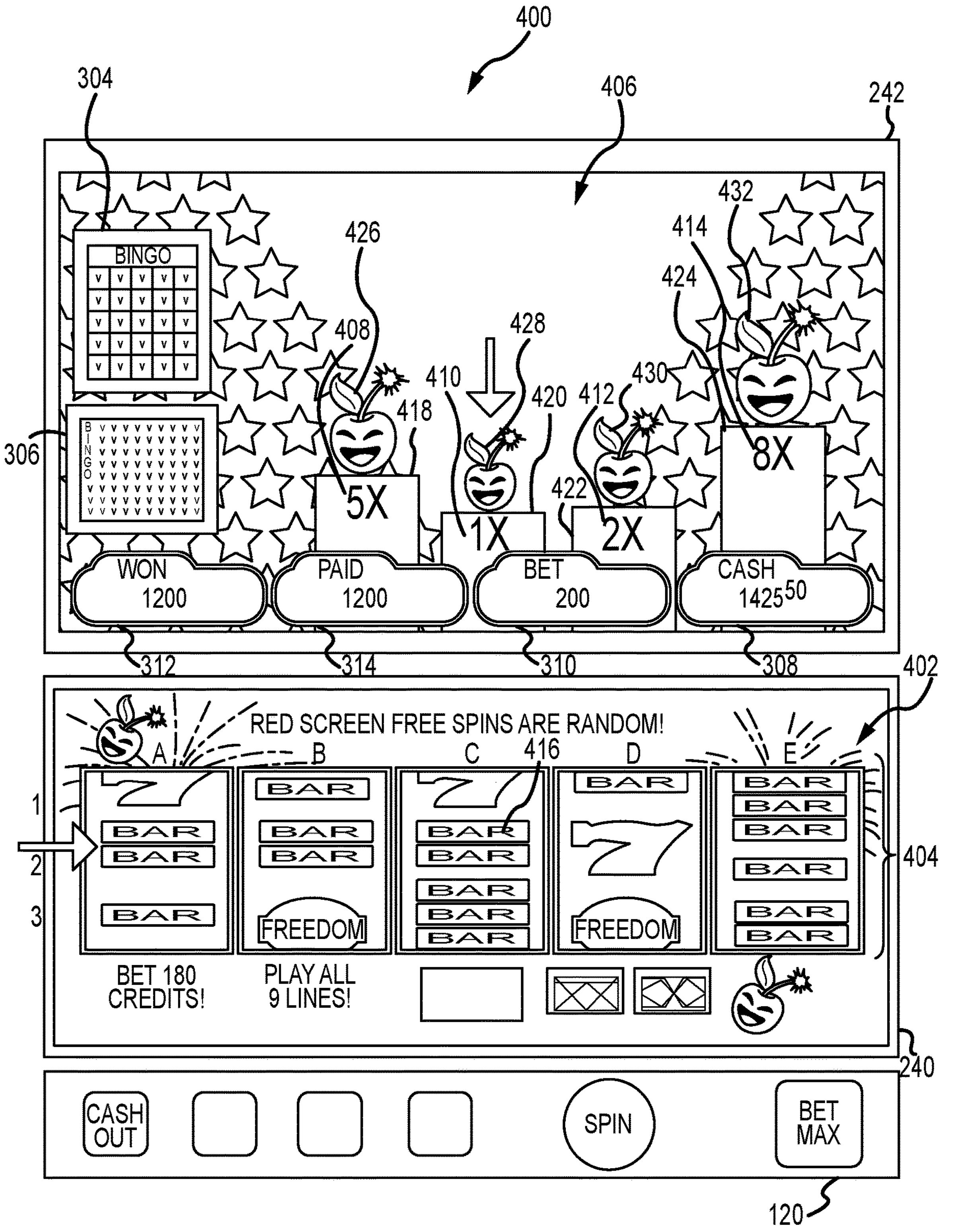
FIG. 6 is a screenshot of the wagering game, as shown in FIG. 4 and FIG. 5, in which a second portion of the award is provided in association with one or more additional winning reel outcomes.

Moreover, processor 204 may award the remaining 200 credits of the 1,200 credit award to the player in conjunction with one or more free spins of the reel strips in matrix 402 (or mechanical reels, in an alternative embodiment). FIG. 6 is a screenshot of the wagering game 400, in which such a remaining portion of an award is provided in association with one or more additional free spins and winning reel outcomes. Also shown in FIG. 6, in at least some embodiments, a multiplier, such as multiplier 410, used to provide at least a portion of an award to a player may be subsequently decreased to an initial or starting value (e.g., "1×") following use of the multiplier to provide the award.

To dispense the remaining portion of the award, any of a variety of reel outcomes totaling 200 credits may be provided. In one example, a single 200 credit reel outcome may be provided. In another example, two 100 credit reel outcomes may be provided. And in yet another example, two 50 credit reel outcomes and one 100 credit reel outcome may be provided. More generally, any combination of reel outcomes giving the remaining portion of the award may be displayed.

Whatever the specific combination of reel outcomes used to award the remaining portion of the initial bingo award, as described herein, a first portion of a bingo award may be provided to a player as a multiplied value of an award associated with a reel outcome and a selected multiplier, and a second portion of the bingo award may be provided to the player in conjunction with one or more free spins of the reel strips in matrix 402. Thus, an award may be provided to a player in somewhat distributed manner through the use of several award distribution techniques (e.g., multipliers and free spins), as described herein.

In some embodiments, free spins may also be provided in conjunction with a change to a background color around matrix 402 and/or a change to a background color around plurality of multipliers 406. For instance, in one embodiment, a background behind matrix 402 and/or multipliers 406 may change to a red background or a "red screen." The red screen may be displayed for the duration of the free spins to let a player know that each free spin will be accompanied by an award (e.g., a partial award, as described herein of a larger bingo award).

A variety of specific improvements to the technical fields of Class II (bingo) gaming and award provisioning are therefore described and illustrated herein. For example, at least one specific improvement is that players may be attracted to an EGM 104A-104X when, as they pass by, wagering game 400 presents one or more pedestals or vertical bars 418-424 or vertical meters indicating one or more large multipliers 408-414. For example, a player walking past an EGM 104A-104X may see that a vertical meter 418-424 (which is easy to spot from a short distance) indicates a multiplier 410 of "10×." As a result, the player may perceive that the multiplier 410 is about to be awarded or "hit," and so sit down at the EGM 104A-104X to play wagering game 400.

Another specific improvement embodied by the present disclosure is that large bingo awards may be distributed to players using a plurality of techniques. For example, as described herein, a first portion of an award may be distributed to a player using a multiplier 408-414 and a reel outcome, and a second portion of the award may be distributed using one or more free spins and one or more reel outcomes.

As a result, a process of providing a large award may continue for a somewhat prolonged duration, adding player satisfaction. In addition, the variation in the way the award is provided (e.g., using a multiplier as well as one or more free spins) also adds to player satisfaction and interest, because the award process is simply more varied and interesting than a traditional bulk increment to a player's credit balance in conjunction with a single celebration graphic.

Another specific improvement embodied by the present disclosure is that display of the "red screen" during free spins may notify a player that each free spin will be accompanied by a partial award. As a result, when the red screen is displayed, player excitement levels may increase substantially. Here as well, player satisfaction may improve, as the red screen may last for a substantial duration, as a plurality of free spins, each winning, are initiated to add award increments to a player's credit balance.

Figure 7:
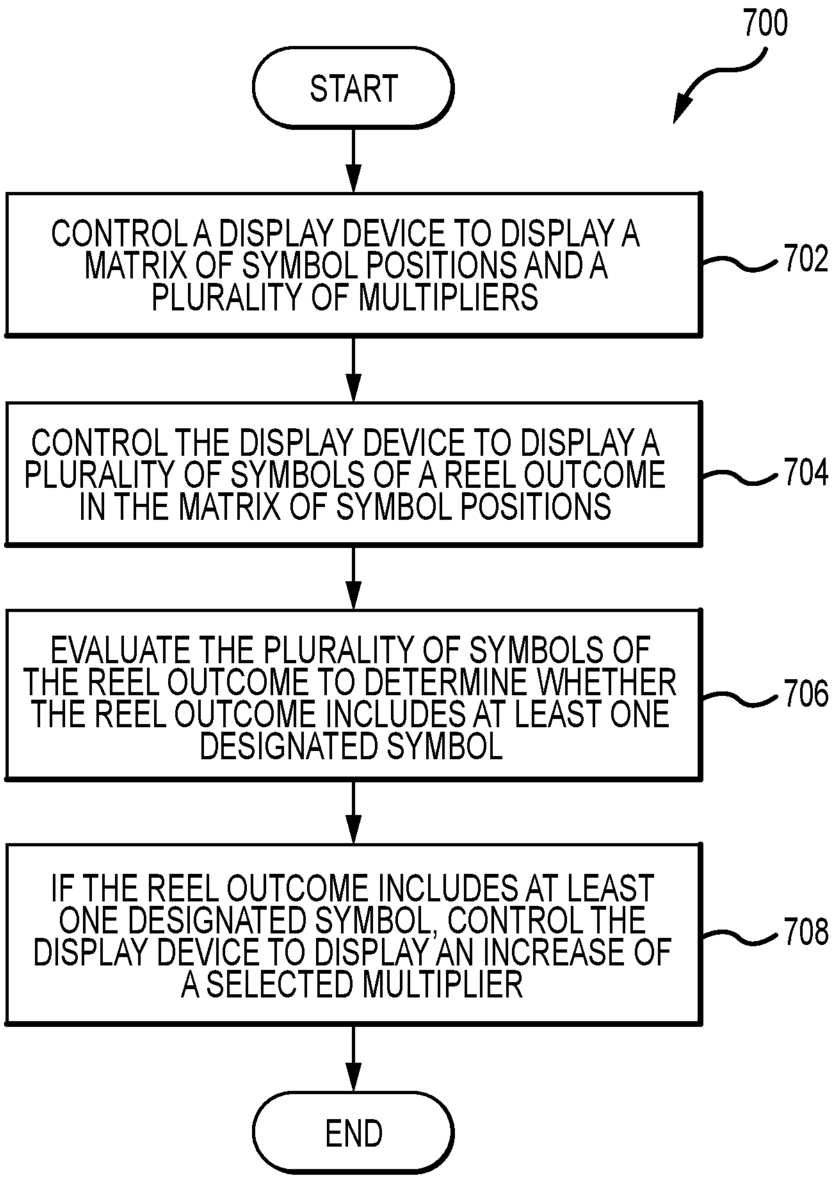
FIG. 7 is a flowchart illustrating a process for determining whether to increase a multiplier.

FIG. 7 is a flowchart illustrating and summarizing a process 700 for determining whether to increase at least one multiplier 408-414, as described in additional detail above. Accordingly, in the example embodiment, a display device 240 and/or 242 may be controlled to display matrix 402 and multipliers 408-414 (step 702). Display device 240 and/or 242 may also be controlled to display a plurality of symbols of a reel outcome in matrix 402 (step 704). More particularly, each symbol of a reel outcome may be selected from a reel strip corresponding to a column of matrix 402, and each symbol position of matrix 402 may be populated with a symbol from a corresponding reel strip. In some embodiments, mechanical reels may be used instead of, or in addition to, matrix 402.

In the example embodiment, processor 204 may also evaluate the plurality of symbols displayed in matrix 402 (i.e., the reel outcome) to determine whether the reel outcome includes at least one designated symbol, such as cherry symbol 416 (step 706). If one or more designated symbols appear in the reel outcome, processor 204 may also control display device 240 and/or 242 to display an increase of one or more multipliers 408-412 (step 708). Further, in various embodiments, processor 204 may provide an award of a winning bingo outcome in conjunction with one or more selected multipliers and a reel outcome, as described herein. A remaining portion of a bingo award may be provided, if it exits, in association with one or more free spins and/or a "red screen" presentation.

Figure 8:
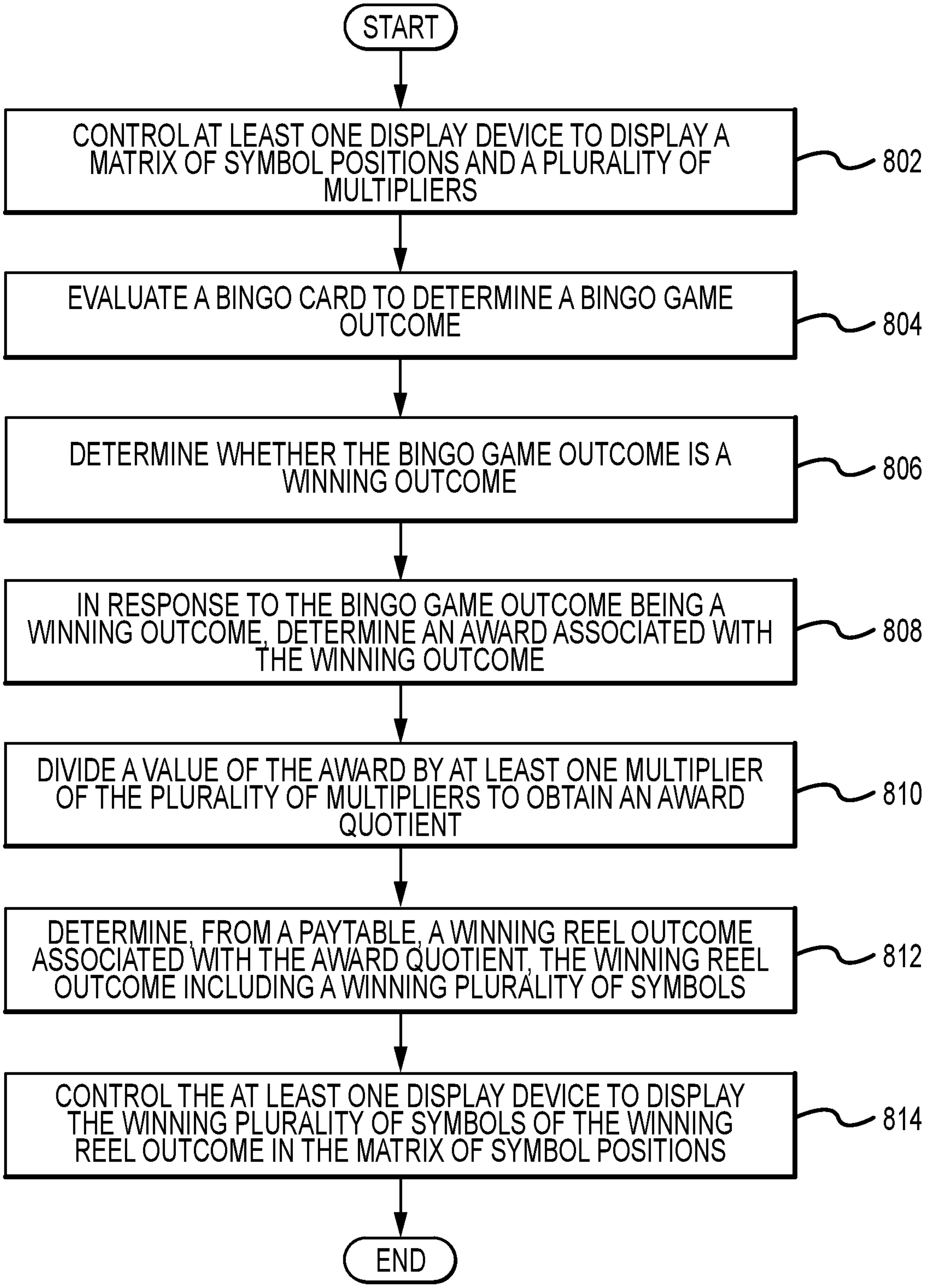
FIG. 8 is a flowchart illustrating and a process for providing an award to a player in association with a selected multiplier.

FIG. 8 is a flowchart illustrating and summarizing a process 800 for providing an award to a player in association with a selected multiplier, as described in additional detail above. It will be appreciated, in addition, that process 800 may be implemented in conjunction with process 700 above to provide awards as well as to provide increases to values of multipliers, sizes of multiplier (cherry) symbols 426-432, etc.

Accordingly, in the example embodiment, display device 240 and/or 242 may be controlled to display matrix 402 and multipliers 408-414 (step 802). As described above, a bingo card may be provided and evaluated, such as against a bingo number listing, by processor 204 to determine a bingo game outcome (step 804). Processor 804 may also determine whether the bingo outcome is a winning outcome (step 806), and if the bingo game outcome is a winning outcome, processor 204 may determine an award associated with the winning outcome (step 808). Further, processor 204 may divide a value of the award (e.g., 1,200 credits, as described in detail above) by at least one multiplier 408-414 (e.g., "10×," as described above) to obtain an award quotient (step 810). Processor 204 may also determine, from a paytable, a winning reel outcome associated with the award quotient (step 812), and control the at least one display device 240 and/or 242 to display a winning plurality of symbols associated with the winning reel outcome in matrix 402 (step 814).

As described herein, in some cases, an award quotient may not exactly correspond to an award in the paytable of reel outcomes. In these instances, processor 204 may select a reel outcome associated with an award that is close (or closest) to the award quotient, and determine a remaining value of the award to be provided during one or more additional re-spins. For example, as described herein, processor 204 may determine a remaining portion of the bingo award, where the remaining portion is simply the difference between the bingo award and the product of the award selected from the paytable of reel outcomes multiplied by the multiplier.

In the example above, the remaining portion of the 1,200 credit award was 200 credits (i.e., 1,200−100*10). In various embodiments, processor 204 may provide a remaining portion of an award (e.g., the 200 credits) to a player in the form of one or more free spins, each of which may be associated with a winning reel outcome. When the individual awards associated with these free spins are added together, they may total the remaining portion of the initial bingo award (i.e., in this example, 200 credits), whereby the player may be provided the remaining portion of the initial bingo award in the form of one or more free spins.

Embodiments of the present disclosure thus provide systems and methods for determining whether to increase at least one multiplier of a plurality of multipliers. For example, in at least one embodiment, a multiplier may be increased in response to the occurrence of a designated symbol, such as a cherry symbol, in a matrix of symbol positions. In addition to increasing a multiplier, embodiments of the present disclosure also provide systems and methods for determining whether to provide an award, such as a bingo award, as well as how to partition or distribute the award. For example, a bingo award may be partially provided to the player in association with a selected multiplier and partially in association with one or more free spins of a plurality of reel strips within the matrix of symbol positions.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:

1. A gaming system having a reduced in size paytable of reel outcomes by utilizing at least one award quotient to perform a search of the paytable of reel outcomes, the gaming system comprising:

a memory storing the paytable of reel outcomes, the paytable of reel outcomes including a listing of award amounts that each correspond to at least one winning symbol combination; and a processor configured to execute instructions stored in the memory, which when executed, cause the processor to at least:

generate a bingo game outcome;

determine a total award value associated with the bingo game outcome;

divide the total award value by a value of a first multiplier of a plurality of multipliers to obtain a first award quotient;

search the paytable of reel outcomes using the first award quotient;

determine, based on the search, an award amount in the paytable of reel outcomes that matches the first award quotient to select a winning symbol combination; and cause the winning symbol combination, the first multiplier, and the total award value to be displayed on a display device.

2. The gaming system of claim 1, wherein the instructions, when executed, further cause the processor to at least:

determine a second bingo game outcome;

determine a second winning symbol combination using the second bingo game outcome;

cause the display device to display the second winning symbol combination;

evaluate the second winning symbol combination to determine whether the second winning symbol combination includes at least one designated symbol; and in response to the second winning symbol combination including the at least one designated symbol: i) increase a value of a selected multiplier of the plurality of multipliers, and ii) cause the display device to display an increase in a size of a multiplier symbol positioned adjacent the selected multiplier, whereby the multiplier symbol appears to metamorphose from a smaller version of itself to a larger version of itself, and whereby the game provides a visual indication of i) a relative size of the selected multiplier and ii) a progress toward an award condition associated with the selected multiplier.

3. The gaming system of claim 2, wherein each multiplier of the plurality of multipliers is displayed in association with a vertical bar of a plurality of vertical bars, and wherein the instructions, when executed, further cause the processor to at least: in response to the second winning symbol combination including the at least one designated symbol, cause the display device to display an increase in a height of a vertical bar associated with the selected multiplier, whereby the plurality of vertical bars appear to race upward, and whereby a player is provided a visual indication of i) a relative size of the selected multiplier and ii) a progress toward an award condition associated with the selected multiplier.

4. The gaming system of claim 1, wherein the instructions, when executed, further cause the processor to at least:

subtract a partial resultant award value from the total award value to determine a remaining portion of the total award value; and award the remaining portion of the total award value.

5. The gaming system of claim 4, wherein awarding the remaining portion of the total award value includes:

determining one or more additional winning pluralities of symbols that evaluate to the remaining portion of the total award value; and causing the display device to display the one or more additional winning pluralities of symbols during one or more free plays.

6. The gaming system of claim 5, wherein the instructions, when executed, further cause the processor to at least:

cause the display device to display a red background when the display device is controlled to display the one or more additional winning pluralities of symbols thereby extending the time taken to provide the total award value, including the remaining portion of the total award value, and whereby a visual indication is caused to be displayed on the display device in the form of the red background that an award sequence associated with the bingo game outcome and total award value is ongoing.

7. The gaming system of claim 1, wherein searching the paytable of reel outcomes using the first award quotient includes identifying an award amount in the paytable that is closest to the first award quotient.

8. A non-transitory computer-readable medium containing instructions embodied thereon, the non-transitory computer-readable medium further having a paytable of reel outcomes that is reduced in size by utilizing at least one award quotient to perform a search of the paytable of reel outcomes, the paytable of reel outcomes including a listing of award amounts that each correspond to at least one winning symbol combination, wherein the instructions, when executed by at least one processor, causes the at least one processor to:

generate a game outcome;

determine a total award value associated with the game outcome;

divide the total award value by a value of a first multiplier of a plurality of multipliers to obtain a first award quotient;

search the paytable of reel outcomes using the first award quotient;

determine, based on the search, an award amount in the paytable of reel outcomes that matches the first award quotient to select a winning symbol combination; and cause the winning symbol combination, the first multiplier, and the total award value to be displayed on a display device.

9. The non-transitory computer-readable medium of claim 8, wherein the instructions, when executed, further cause the at least one processor to at least:
- determine a second game outcome;
- determine a second winning symbol combination using the second game outcome;
- cause the display device to display the second winning symbol combination;
- evaluate the second winning symbol combination to determine whether the second winning symbol combination includes at least one designated symbol; and
- in response to the second winning symbol combination including the at least one designated symbol: i) increase a value of a selected multiplier of the plurality of multipliers, and ii) cause the display device to display an increase in a size of a multiplier symbol positioned adjacent the selected multiplier, whereby the multiplier symbol appears to metamorphose from a smaller version of itself to a larger version of itself, and whereby the game provides a visual indication of i) a relative size of the selected multiplier and ii) a progress toward an award condition associated with the selected multiplier.

10. The non-transitory computer-readable medium of claim 9, wherein each multiplier of the plurality of multipliers is displayed in association with a vertical bar of a plurality of vertical bars, and wherein the instructions, when executed, further cause the at least one processor to at least:
- in response to the second winning symbol combination including the at least one designated symbol, cause the display device to display an increase in a height of a vertical bar associated with the selected multiplier, whereby the plurality of vertical bars appear to race upward, and whereby a player is provided a visual indication of i) a relative size of the selected multiplier and ii) a progress toward an award condition associated with the selected multiplier.

11. The non-transitory computer-readable medium of claim 8, wherein the instructions, when executed, further cause the at least one processor to at least:
- subtract a partial resultant award value from the total award value to determine a remaining portion of the total award value; and
- award the remaining portion of the total award value.

12. The non-transitory computer-readable medium of claim 11, wherein awarding the remaining portion of the total award value includes:
- determining one or more additional winning pluralities of symbols that evaluate to the remaining portion of the total award value; and
- causing the display device to display the one or more additional winning pluralities of symbols during one or more free plays.

13. The non-transitory computer-readable medium of claim 12, wherein the instructions, when executed, further cause the at least one processor to at least:
- cause the display device to display a red background when the display device is controlled to display the one or more additional winning pluralities of symbols thereby extending the time taken to provide the total award value, including the remaining portion of the total award value, and whereby a visual indication is caused to be displayed on the display device in the form of the red background that an award sequence associated with the game outcome and total award value is ongoing.

14. The non-transitory computer-readable medium of claim 13, wherein searching the paytable of reel outcomes using the first award quotient includes identifying an award amount in the paytable that is closest to the first award quotient.

15. A method of gaming comprising:
- storing a paytable of reel outcomes on a memory, the paytable of reel outcomes including entries of award amounts that each correspond to at least one winning symbol combination;
- generating a game outcome;
- determining a total award value associated with the game outcome;
- reducing a size of the paytable of reel outcomes by utilizing a dynamic lookup of the paytable of reel outcomes to select a winning symbol combination based on the total award value, the dynamic lookup including:
- dividing the total award value by a value of a first multiplier of a plurality of multipliers to obtain a first award quotient;
- searching the paytable of reel outcomes using the first award quotient; and
- determining, based on the search, an award amount in the paytable of reel outcomes that matches the first award quotient to select the winning symbol combination; and
- causing the winning symbol combination, the first multiplier, and the total award value to be displayed on a display device.

16. The method of claim 15 further comprising:
- determine a second game outcome;
- determining second winning symbol combination using the second game outcome;
- causing the display device to display the second winning symbol combination;
- evaluating the second winning symbol combination to determine whether the second winning symbol combination includes at least one designated symbol; and
- in response to the second winning symbol combination including the at least one designated symbol: i) increasing a value of a selected multiplier of the plurality of multipliers, and ii) causing the display device to display an increase in a size of a multiplier symbol positioned adjacent the selected multiplier, whereby the multiplier symbol appears to metamorphose from a smaller version of itself to a larger version of itself, and whereby the game provides a visual indication of i) a relative size of the selected multiplier and ii) a progress toward an award condition associated with the selected multiplier.

17. The method of claim 16, wherein each multiplier of the plurality of multipliers is displayed in association with a vertical bar of a plurality of vertical bars, and wherein the method further comprises:
- in response to the second winning symbol combination including the at least one designated symbol, causing the display device to display an increase in a height of a vertical bar associated with the selected multiplier, whereby the plurality of vertical bars appear to race upward, and whereby a player is provided a visual indication of i) a relative size of the selected multiplier and ii) a progress toward an award condition associated with the selected multiplier.

18. The method of claim 15 further comprising:
- subtracting a partial resultant award value from the total award value to determine a remaining portion of the total award value; and
- awarding the remaining portion of the total award value.

19. The method of claim 18, wherein awarding the remaining portion of the total award value includes:

determining one or more additional winning pluralities of symbols that evaluate to the remaining portion of the total award value; and causing the display device to display the one or more additional winning pluralities of symbols during one or more free plays.

* * * * *